US010784520B2

(12) United States Patent
Navarro et al.

(10) Patent No.: US 10,784,520 B2
(45) Date of Patent: Sep. 22, 2020

(54) LIQUID BATTERY READY DOWNHOLE POWER SYSTEM

(71) Applicant: HALLIBURTON ENERGY SERVICES, INC., Houston, TX (US)

(72) Inventors: Rex Dael Navarro, Singapore (SG); Philbert Pasco Perez, Singapore (SG); Wihaga Satya Khresna, Singapore (SG)

(73) Assignee: Halliburton Energy Services, Inc., Houston, TX (US)

( * ) Notice: Subject to any disclaimer, the term of this patent is extended or adjusted under 35 U.S.C. 154(b) by 71 days.

(21) Appl. No.: 16/223,557

(22) Filed: Dec. 18, 2018

(65) Prior Publication Data

US 2019/0115600 A1     Apr. 18, 2019

Related U.S. Application Data

(62) Division of application No. 15/022,460, filed as application No. PCT/US2013/071167 on Nov. 21, 2013, now Pat. No. 10,199,659.

(51) Int. Cl.

| | | |
|---|---|---|
| *H01M 10/38* | (2006.01) | |
| *H01M 10/42* | (2006.01) | |
| *H01M 6/50* | (2006.01) | |
| *H01M 6/36* | (2006.01) | |
| *H01M 2/02* | (2006.01) | |
| *H01M 2/30* | (2006.01) | |
| *H01M 10/39* | (2006.01) | |
| *H01M 10/48* | (2006.01) | |
| *H01M 16/00* | (2006.01) | |
| *E21B 41/00* | (2006.01) | |
| *H01M 4/38* | (2006.01) | |
| *H01M 10/052* | (2010.01) | |
| *H01M 10/615* | (2014.01) | |
| *H01M 10/657* | (2014.01) | |
| *H01M 4/02* | (2006.01) | |

(52) U.S. Cl.
CPC ........... *H01M 6/36* (2013.01); *E21B 41/0085* (2013.01); *H01M 2/024* (2013.01); *H01M 2/025* (2013.01); *H01M 2/30* (2013.01); *H01M 4/38* (2013.01); *H01M 6/5038* (2013.01); *H01M 6/5088* (2013.01); *H01M 10/38* (2013.01); *H01M 10/39* (2013.01); *H01M 10/425* (2013.01); *H01M 10/48* (2013.01); *H01M 16/00* (2013.01); *H01M 10/052* (2013.01); *H01M 10/3909* (2013.01); *H01M 10/615* (2015.04); *H01M 10/657* (2015.04); *H01M 2004/027* (2013.01); *H01M 2004/028* (2013.01); *H01M 2220/10* (2013.01)

(58) Field of Classification Search
CPC ........ H01M 2/025; H01M 2/30; H01M 10/38; H01M 10/39; H01M 10/425; H01M 10/48; H01M 16/00; H01M 6/5088; H01M 6/5038; H01M 6/36; H01M 4/38; H01M 2/024; H01M 10/052; H01M 10/3909; H01M 10/615; H01M 10/657; H01M 2004/028; H01M 2004/027; H01M 2220/10; E21B 41/0085

See application file for complete search history.

(56) References Cited

U.S. PATENT DOCUMENTS

| | | |
|---|---|---|
| 3,741,811 A | 6/1973 | Coury |
| 2004/0191626 A1 | 9/2004 | Lewis, Jr. et al. |
| 2013/0106366 A1 | 5/2013 | Fripp et al. |
| 2013/0229142 A1* | 9/2013 | Teodorescu ............. H02J 7/342 320/103 |
| 2014/0374088 A1* | 12/2014 | Kruspe ................ G01V 11/002 166/244.1 |

OTHER PUBLICATIONS

Bradwell, et al., "Magnesium-Antimony Liquid Metal Battery for Stationary Energy Storage," Journal of the American Chemical Society, Jan. 6, 2012, vol. 134, pp. 1895-1897.
International Search Report and The Written Opinion of the International Searching Authority, or the Declaration, dated Feb. 2014, PCT/US2013/071167, 11 pages, ISA/US.

\* cited by examiner

*Primary Examiner* — Muhammad S Siddiquee
(74) *Attorney, Agent, or Firm* — Haynes and Boone, LLP (57) ABSTRACT

A battery cell housing and control system enables the use of liquid battery power systems in various applications, including downhole environments. The cell housing includes a plurality of conductive terminals spaced there-around to provide conductivity between the electrochemical solution and the load. Sensors provide orientation data to the control system to thereby determine which terminals should be activated to provide power to a load.

10 Claims, 9 Drawing Sheets

LIQUID BATTERY READY DOWNHOLE POWER SYSTEM

PRIORITY

The present application is a Divisional patent application of U.S. patent application Ser. No. 15/022,460, filed on Mar. 16, 2016, which is a U.S. National Stage patent application of International Patent Application No. PCT/US2013/071167, filed on Nov. 21, 2013, the benefit of which is claimed and the disclosure disclosures of which are incorporated herein by reference in their entirety.

FIELD OF THE DISCLOSURE

The present disclosure relates generally to power systems and, more specifically, to a liquid battery ready power systems especially useful in dynamic environments, such as downhole applications.

BACKGROUND

Downhole batteries being utilized for wellbore operations are generally made using non-liquid type cells, such as those using Lithium-Thionyl chloride chemistry. However, the usefulness of such batteries is limited in downhole environments because the battery cells have operating temperature limitations which may be exceeded downhole by the downhole environment.

Accordingly, there is a need in the art for a more robust battery cell useful in challenging environments, such as downhole applications.

DESCRIPTION OF ILLUSTRATIVE EMBODIMENTS

Illustrative embodiments and related methodologies of the present disclosure are described below as they might be employed in a liquid battery-ready power system useful in various applications, including downhole power systems. In the interest of clarity, not all features of an actual implementation or methodology are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure. Further aspects and advantages of the various embodiments and related methodologies of the disclosure will become apparent from consideration of the following description and drawings.

As described herein, illustrative embodiments of the present disclosure provide a battery housing and control system to enable the use of liquid battery power systems in various applications, including downhole environments. In a generalized embodiment, a liquid battery cell includes an insulated cell housing have electrochemical solution positioned inside. The housing may comprise a polyhedron or spherical shape, and include a plurality of terminals positioned there-around to transfer the generated current to a load. As a result of the positioning of the terminals around the housing, the anode and cathode of the electrochemical solution are always in contact with two or more of the terminals, thus allowing use of the battery no matter the orientation of the battery. The power system also includes a control system to determine the most optimal terminals to activate based upon the orientation of the battery. Accordingly, liquid battery power systems described herein may be utilized in a variety of applications, including downhole environments where the battery is subject to harsh environments and varying orientations during use.

Figure 1:
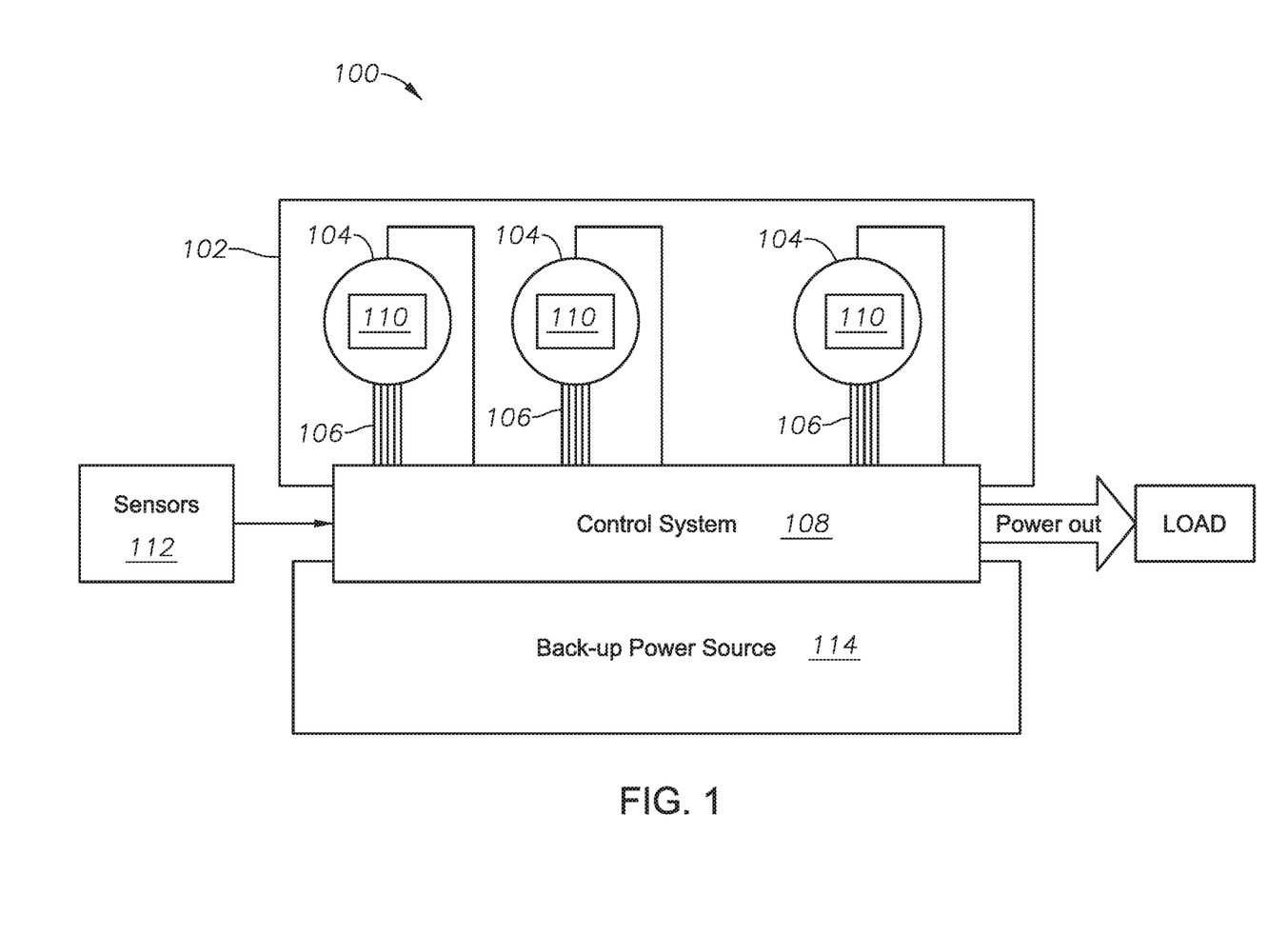
FIG. 1 is a block diagrammatical illustration of a liquid battery power system according to certain illustrative embodiments of the present disclosure.

FIG. 1 is a block diagrammatical illustration of a liquid battery power system 100 according to certain illustrative embodiments of the present disclosure. Power system 100 includes a liquid cell assembly 102 having one or more liquid battery cells 104 positioned therein. Each liquid battery cell 104 is a liquid battery having an electrochemical solution such as, for example, a liquid-metal sodium-sulfur (Na∥S) solution that has a solid electrolyte between liquid metal electrodes. Other examples of electrochemical solutions utilized by liquid battery cells 104 include Magnesium-Antimony (Mg∥Sb), which has the electrolyte in liquid form. Other chemistries may also be utilized that offer higher voltage, relatively lower temperature and lower cost. Nevertheless, those ordinarily skilled in the art having the benefit of this disclosure realize there are a variety of other liquid type batteries which may be utilized in embodiments of the present disclosure.

Liquid battery cells 104 each have a heating element 110 which provides the heat necessary to liquefy or maintain the electrodes' (i.e., anode/cathode of electrochemical solution) molten state. Liquid battery cells 104 also have plurality of conductive terminals (not shown) connected thereto to transfer generated current to control system 108 via terminal matrices 106. Control system 108 performs a variety of functions for power system 100 including, for example, the control of heating element 110, and the selective activation of the conductive terminals of cells 104. Sensors 112 are operationally coupled to control system 108 to thereby provide data related to the orientation of liquid battery cells 104. Sensors 112 may be positional sensors which provide data related to the angular inclination of battery cells 104 along various planes. In addition, sensors 112 may be centrifugal sensors that provide data related to the centrifugal forces acting on battery cells 104 as they are being rotated along a drilling assembly, for example. Illustrative sensors may include, for example, hall-effect, rotary encoder, accelerometer or micro-electromechanical system-based gyroscopes. Using this orientation data received from sensors 112, control system 108 determines which conductive terminals to activate to thereby continuously provide power to load from battery cells 104.

Control system 108 is also operationally coupled to a back-up power system 114 (i.e., secondary battery cell). Power system 114 may be a variety of power systems, such as, for example, lithium batteries, a generator (e.g., mud-based motor/generator), etc. Power system 114 may form part of power system 100 or may be located remotely from power system 100. As will be described in more detail below, power system 114 may be utilized initially, for example, to place the metal in the electrochemical solution of battery cells 104 into a molten state, whereby subsequent power generated by battery cells 104 will maintain the electrolyte and/or metal in the molten state. Alternatively, power system 114 may also be used to maintain the metal in the molten state. In yet other embodiments, battery cells 104 may be charged fully before deployment into a given environment. Thus, keeping the electrochemical solution molten may be done by cells 104 themselves or by back-up power system 114.

In one illustrative application that will be discussed in more detail below, power system 100 may be deployed into a downhole environment along a bottom hole assembly ("BHA"). If a lithium battery was utilized as power system 114, typically it could not be operated in greater than 200° C. As such, the lithium batteries may help maintain the molten state of the liquid battery cells 104 while traversing downhole, but is put into non-operational mode (storage) by control system 108 when the downhole temperature exceeds 200° C.

It should also be noted that control system 108 includes at least one processor and a non-transitory and computer-readable storage, all interconnected via a system bus. Software instructions executable by the processor for implementing the illustrative orientation determination and terminal selection methodologies described herein in may be stored in local storage or some other computer-readable medium. It will also be recognized that the same software instructions may also be loaded into the storage from a CD-ROM or other appropriate storage media via wired or wireless methods.

Moreover, those ordinarily skilled in the art will appreciate that various aspects of the disclosure may be practiced with a variety of computer-system configurations, including hand-held devices, multiprocessor systems, microprocessor-based or programmable-consumer electronics, minicomputers, mainframe computers, and the like. Any number of computer-systems and computer networks are acceptable for use with the present disclosure. The disclosure may be practiced in distributed-computing environments where tasks are performed by remote-processing devices that are linked through a communications network. In a distributed-computing environment, program modules may be located in both local and remote computer-storage media including memory storage devices. The present disclosure may therefore, be implemented in connection with various hardware, software or a combination thereof in a computer system or other processing system.

Figure 2A:
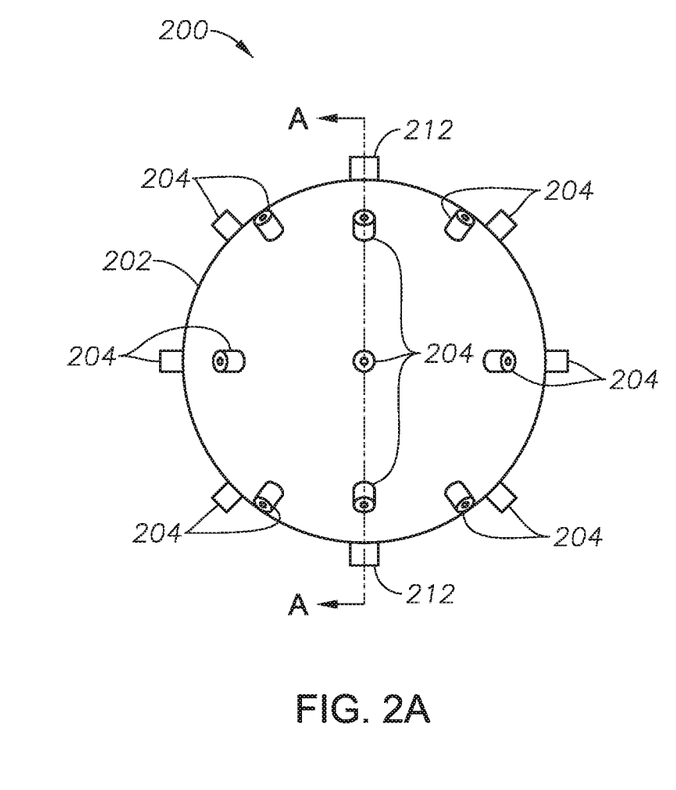
FIGS. 2A and 2B illustrate a three-dimensional and cross-sectional view (along line A-A of FIG. 2A), respectively, of a liquid battery cell utilized in a power system according to certain illustrative embodiments of the present disclosure.
Figure 2B:
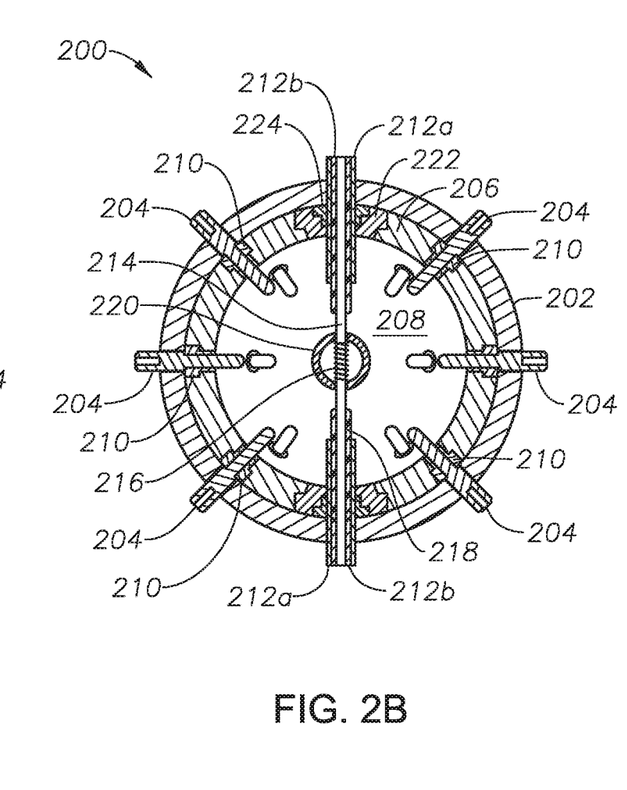

FIGS. 2A and 2B illustrate a three-dimensional and cross-sectional view (along line A-A of FIG. 2A), respectively, of a liquid battery cell 200 utilized in a power system according to certain illustrative embodiments of the present disclosure. As will be described below, liquid battery cell 200 includes an insulated housing 202 that provides heating and electromagnetic wave shielding from heat loss, in addition to a matrix of conductive terminals 204 positioned around housing 202. Housing 202 may take a variety of shapes, including, for example, a polyhedron or spherical shape. Additionally, housing 202 may act as a vibration dampener when battery cell 200 is utilized in such an environment. In certain embodiments, conductive terminals 204 are positioned equidistant to each neighboring terminal 204 at polyhedron vertices.

An electrically insulated hollow compartment 206 is positioned underneath housing 202 to house an electrochemical solution 208. In this example, compartment 206 is a heat resistant and non-conductive material such as a ceramic sphere that provides insulation to minimize heat loss. Alternatively, compartment 206 may be made of any material which does not react with electrochemical solution 208. Although not shown, an additional lining may be utilized to provide chemical insulation and friction reduction along the inner surface of compartment 206. Electrochemical solution 208 may be a variety of liquid-type electrode solutions, including, for example, liquid and solid electrolyte metal solutions, as will be understood by those ordinarily skilled in the art having the benefit of this disclosure. As will be described in more detail below, no matter the orientation of battery cell 200, the anode/cathode of electrochemical solution 208 is always in contact with two or more of conductive terminals 204 to thereby provide power to a load.

Conductive terminals 204 are electronically selectable electrode terminals. In certain illustrative embodiments, a matrix of evenly-spaced electrode terminals 204 provides dynamically-enabled electrodes for actual battery use. As shown in FIG. 2B, terminals 204 have a first end that extends into compartment 206 to contact electrochemical solution 208, and a second end that extends outside of housing 204 and connects to control system 108 (FIG. 1) to provide power to a load. As described below, a polyhedron configuration may be used to determine the spacing of terminals 204. For example, icosahedron-based vertices translate to twelve terminals, while a pentakis dodecahedron-based vertices translate to thirty-two terminals. During operation, control system 108 (FIG. 1) analyzes the orientation of battery cell 204 to determine which terminals 204 should be activated to provide power to the load. In some embodiments, only one terminal 204 is selected for the anode/cathode (two terminals total), while in other embodiments two or more terminals 204 may be selected for the anode/cathode (four or more terminals total). A mounting cap 210 is positioned around terminals 204 to provide sealing and insulation between terminals 204 and compartment 206. Cap 210 may be made of a variety of materials, such as, for example, a high temperature/strength polymer, rubber, elastomer or similar compound.

When liquid metal is utilized in electrochemical solution 208, the metal electrodes must be heated to a molten state. In certain illustrative embodiments of the present invention, such heating may be achieved using induction. To achieve this, two dual purpose terminals 212 are positioned at the top and bottom of battery cell 204. Terminals 212 are dual purpose because they are used to heat compartment 206 and provide power from electrochemical solution 208. Terminals 212 include a conductive terminal 212a which serves the same purpose as conductive terminals 204. Positioned inside terminal 212a is terminal 212b which is used to heat compartment 206. Heating terminal 212b is connected to a controlled power source, such as, for example, backup power system 114 (FIG. 1). As mentioned above, in one embodiment, power system 114 may be used initially to provide enough power to put the electrolyte and metal in electrochemical solution 208 into liquid state. Heat is transferred from compartment 206 to electrochemical solution 208 (anode, cathode and electrolyte) by heat conduction. Subsequently, power may be switch to terminals 204 of battery cell 200, thus using the liquid battery's own power for molten state maintenance.

In order to provide the heat, a heating element wire 214 extends from a power source down through heating terminal 212b, and connects to induction heating coil 216 (i.e., heating element). Insulation 218 is placed around wire 214 to provide insulation between terminals 212a and 212b. In this illustrative embodiment, heating coil 216 is a coil that provides heating to liquefy or help maintain the electrodes' (and in some cases includes the electrolyte's) (i.e., electrochemical solution 208) molten state. It may provide this heating by induction (Joule-heating) to a heating sphere 220 positioned around it. Heating sphere 220 may be, for example, made of a ferrous material that is heated up by induction. An insulating material lining (not shown) exists between sphere 220 and heater coil 216, as well as insulation from the liquid metals and electrolyte of electrochemical solution 208. Note that sphere 220 may take other shapes as well.

Positioned around dual purpose terminals 212 is an insulated cap 222 used to secure terminals 212 to compartment 206. Insulator cap 222 may be, for example, made of a ceramic or high temperature epoxy. A seal cap 224 is positioned inside insulator cap 22 to provide sealing and mounting for terminals 212. Cap 224 may be made of a variety of material, such as, for example, high temperature/strength polymers, rubbers, elastomers or similar compounds.

Figure 3A:
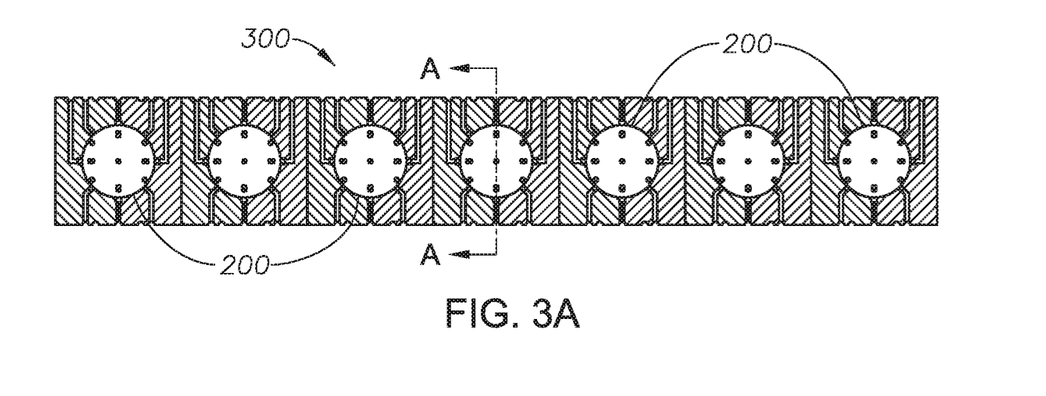
FIGS. 3A and 3B illustrate a two-dimensional and sectional view (along line A-A of FIG. 3A), respectively, of a liquid battery cell assembly according to certain illustrative embodiments of the present disclosure.
Figure 3B:
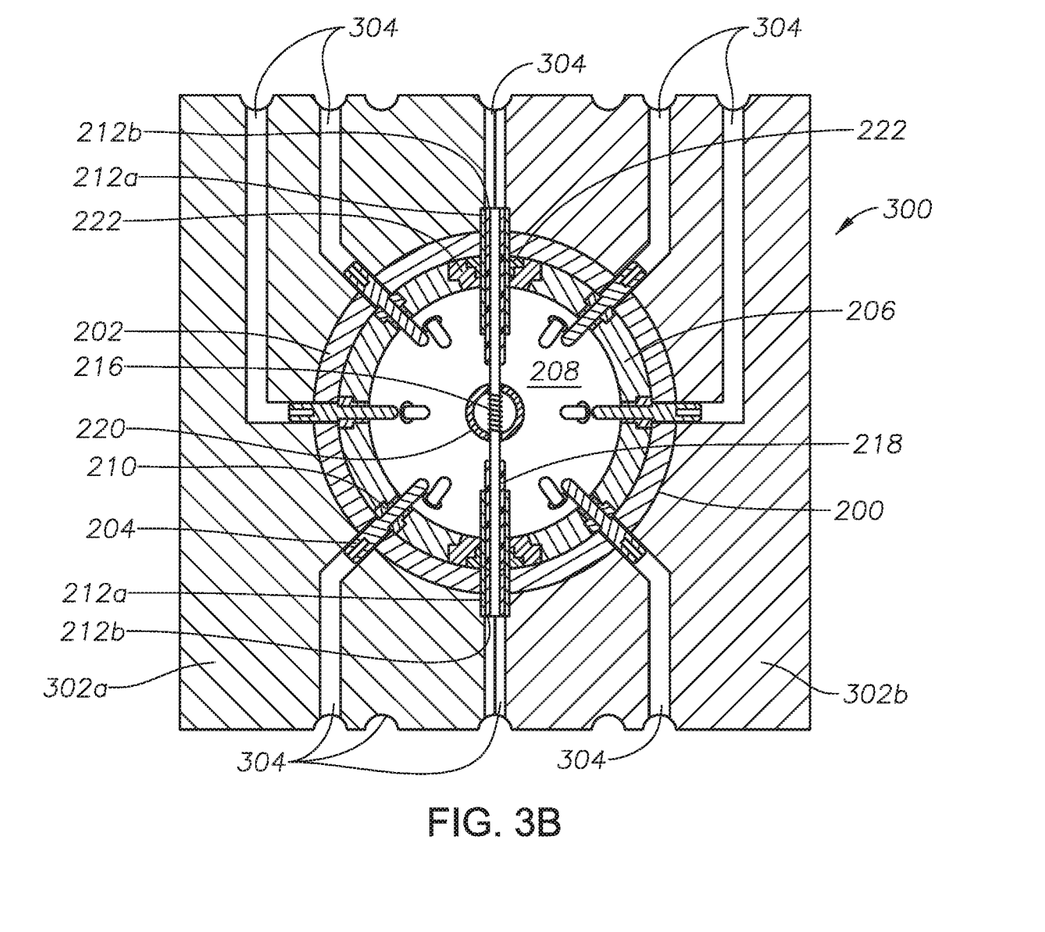

In certain other illustrative embodiments of the present disclosure, a plurality of liquid battery cells may be combined into a liquid cell assembly. FIGS. 3A and 3B illustrate a two-dimensional and sectional view (along line A-A of FIG. 3A), respectively, of a liquid cell assembly 300 according to certain illustrative embodiments of the present disclosure. Liquid battery cells 200 are the same as those described previously. Liquid cell assembly 300 includes a connector block 302 having two sides 302a and 302b. Connector block 302 is made of a non-electrically conductive material that acts as additional heat insulation, such as, for example, polymers or ceramic materials. After insertion of cells 220, sides 302a and 302 may be connected together by a fastener, such as using adhesive materials, such as, for example, an epoxy, or using screws or nuts and bolts. Each side 302a,b includes a plurality of channels 304 which extend down to terminals 204 and 212. Although not shown, suitable wiring is positioned along channel 304 in order to conduct power to control system 108 and the load.

Figure 4A:
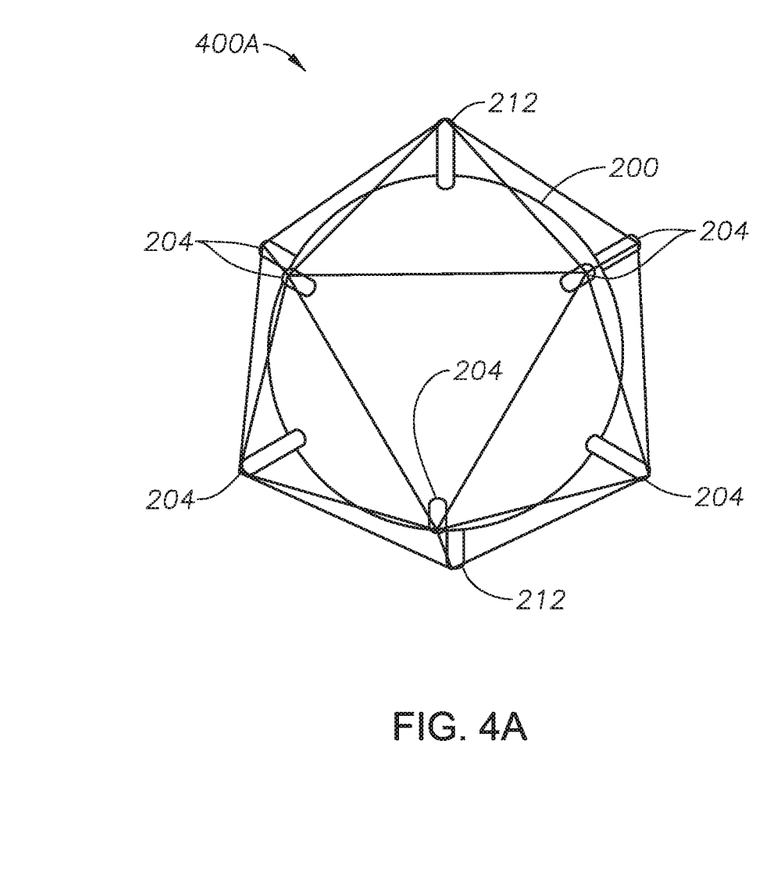
FIGS. 4A and 4B illustrate a liquid battery cell having an icosahedron and pentakis dodecahedron configuration, respectively, according to illustrative embodiments of the present disclosure.
Figure 4B:
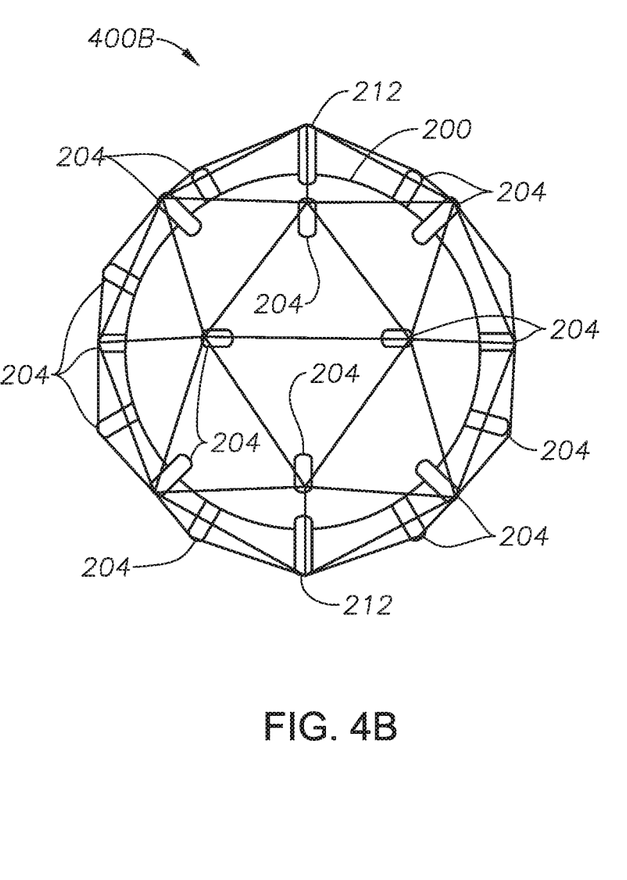

Referring back to FIG. 1, control system 108 analyzes the orientation of battery cells 104 to thereby determine which conductive terminals 204,212 to activate, as previously mentioned. An illustrative methodology utilized by control system 108 to achieve this will now be described. FIGS. 4A and 4B illustrate an icosahedron and pentakis dodecahedron configuration, respectively, used to design a liquid battery cell 200, according to illustrative embodiments of the present disclosure. As shown, configuration 400A includes twelve vertices, where each vertex has one terminal 204,212 positioned thereon. Configuration 400B, on the other hand, includes thirty-two vertices, where each vertex also has one terminal 204,212. In one illustrative embodiment, polyhedron terminal configuration 400A allows evenly-spaced terminals 204,212 across its spherical surface. Therefore, the vertices may be mathematically determined using Cartesian coordinates or spherical coordinates (such as, for example, longitude and latitude). In the icosahedron configuration 400B, for example, the coordinates are determined with terminal-to-terminal at two units, centered at the origin: $(0, \pm 1, \pm \varphi)$, $(\pm 1, \pm \varphi, 0)$ and $(\pm \varphi, 0, \pm 1)$, where $\varphi=(1+\sqrt{5})/2$ is the desired ratio. Using this approach, the number and location of the vertices/terminals 204,212 may be designed using a variety of modeling platforms, including, for example polyhedron models, CAD softwares (HEDRON, Solidworks, OpenSCAD, for example).

Figure 5:
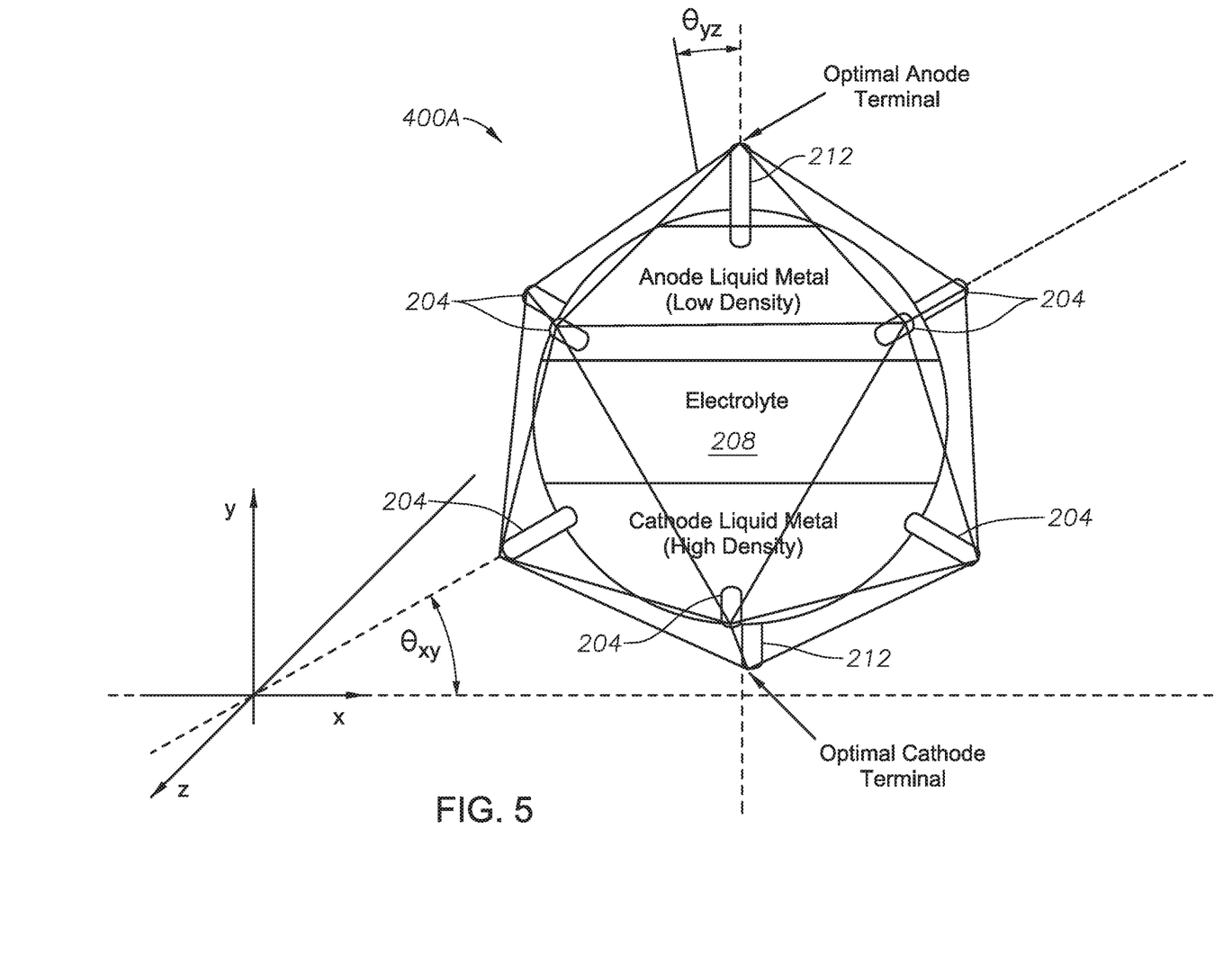
FIG. 5 illustrates configuration of a liquid battery cell having an inclined orientation, according to an illustrative methodology of the present disclosure.

FIG. 5 illustrates configuration 400A of a liquid battery cell having an inclined orientation, according to an illustrative methodology of the present disclosure. If, for example, liquid battery cells as described herein are deployed into a wellbore, the cells will undergo various changes in angular inclination, in addition to having centrifugal forces applied thereon if the string is rotating. Therefore, control system 108 must determine the inclination/centrifugal applied forces using sensors 112, and then analyze this data to select which terminals 204,212 to activate. As shown in FIG. 5, when the angles of inclination from both xy and yz planes are known (i.e., from position sensor 112), the optimal anode terminal and cathode terminals of electrochemical solution 208 selection are determined mathematically by control system 108.

In certain illustrative methodologies, control system 108 achieves this using the following method. First, the angular position of the cell may be defined as inclination angle $\Theta$ and azimuth angle $\varphi$. This could be the same as the inclination and azimuth of the BHA while downhole. In a cell, the vertices (or terminal positions) may be converted into spherical coordinates. A cell's normal position ($\Theta=0°$, $\varphi=0°$) may be considered the base position such that the top terminal indicates the North Terminal with latitude and longitude coordinates at (90°, 0°), while the bottom terminal indicates the South Terminal at (−90°, 0°). As an example, for an icosahedron terminal configuration, the rest of the 10 terminals are positioned at latitude $\pm\arctan(\frac{1}{2})=26.57°$ with longitudinal spacing of 36°. A virtual equator at the center defines the 0° latitudinal position. A virtual prime meridian may be defined for a cell to represent the 0° longitudinal position.

From above, an array of coordinates can be generated such that Latitude Array LTA[ ] and Longitude Array LNA[ ]:

90°, if index=1.

LTA[index]=−arctan(½), if 1<index<12 and index is odd arctan(½), if 1<index<12 and index is even −90°, if index=12

0°, if index=1 or index=12

LNA[index]=(index−2)*36°, if 1<index<12.

With position information, a positional North and South Terminal coordinate (relative to the normal position of the cell) may be defined as follows:

Positional North, PN=(90°−Θ, 180°−φ); and

Positional South, PS=(Θ−90, −φ).

PS and PN are the ideal terminal positions, so the nearest terminals would be the optimal terminal selection. The central angle Δσ between PS or PN from each terminal is given by the spherical law of cosines:

Δσ=arcos(sin φ$_1$ sin φ$_2$+cos φ$_1$ cos φ$_2$ cos Δλ),   Eq.(1), where (φ$_1$, λ$_1$) is either the PS or PN position, (φ$_2$, λ$_2$) is the terminal position (from the array of coordinates), and Δλ is the absolute difference between λ$_1$ and λ$_2$. Equation 1 may be shortened as a function CentralAngle(Position1, Position2). The distance d, the arc length, is given by:

d=rΔσ,   Eq.(2), where r is the radius of the cell.

In an illustrative embodiment of the present disclosure, the smallest Δσ is enough to determine which terminal is nearest to the PN and which one is nearest to PS. A list of central angles may then be created for the terminals from PN and PS, as defined by:

CentralAngleFromPN[index]=CentralAngle(PN,(LTA [index],LNA[index])); and

CentralAngleFromPS[index]=CentralAngle(PS,(LTA [index],LNA[index])).

Optimal terminal index can then found by looking for the smallest distance:

[minDistFromPN, OptimalNorthIndex]=min(CentralAngleFromPN); and

[minDistFromPS, OptimalSouthIndex]=min(CentralAngleFromPS).

The illustrative syntax described above is based on Matlab. OptimalNorthIndex and OptimalSouthIndex shall contain the index of the optimal terminal selection.

Therefore, using the foregoing method, one or more terminals 204,212 may be selected for each electrode. Thus, in an illustrative embodiment, one or more terminals 204, 212 may be selected for the anode liquid metal of FIG. 5, while one or more terminals 204,212 may be selected for the cathode liquid metal of FIG. 5. Such an embodiment is particularly useful in wellbore applications where a drill string does not rotate and the liquid metal and electrolyte of solution 208 are primarily subjected to gravity for stratification (i.e., the layering of the anode and cathode liquid metals as well as the electrolyte due to their different densities).

Figure 6:
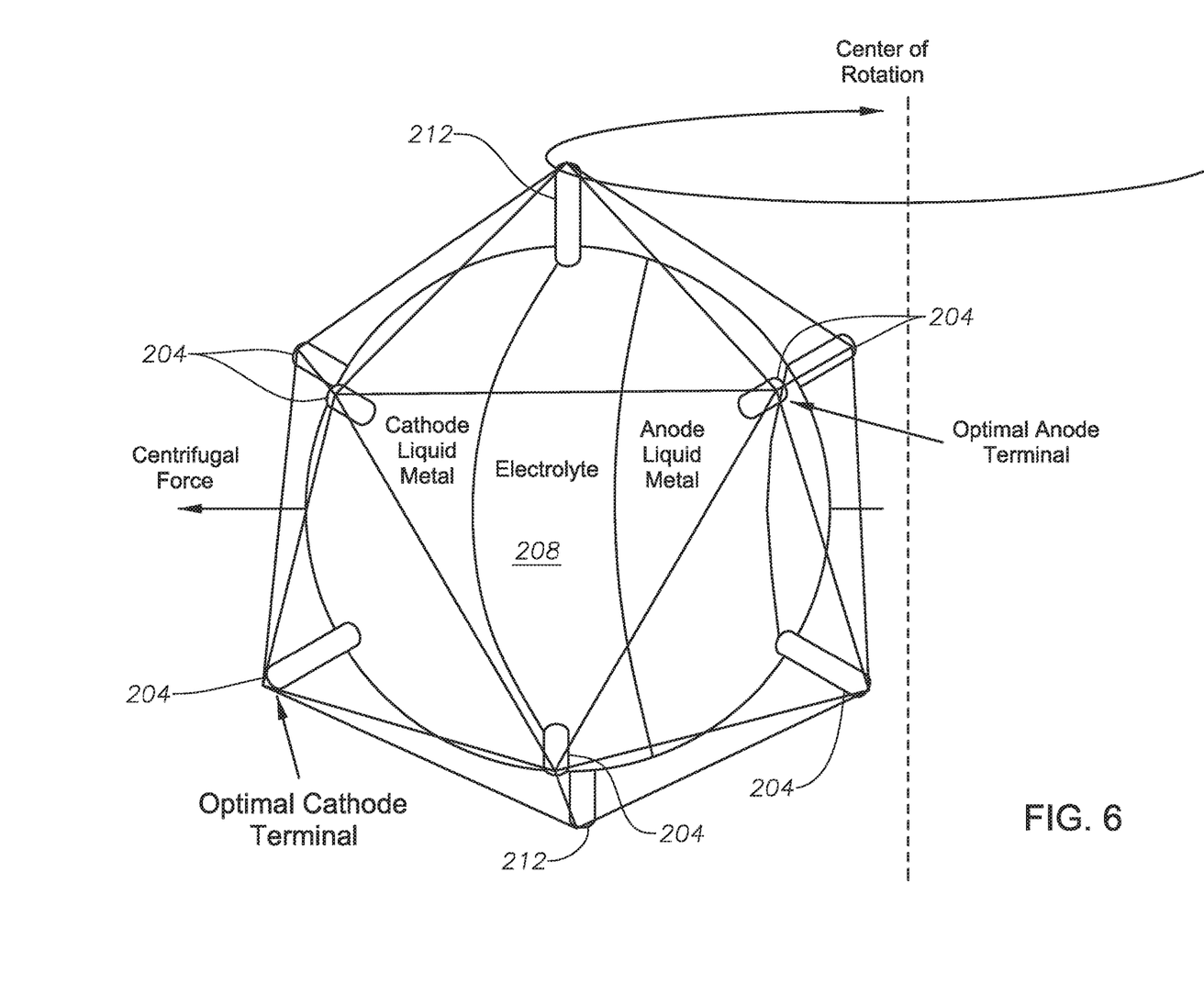
FIG. 6 illustrates configuration of a liquid battery cell being rotated, according to an illustrative methodology of the present disclosure.

FIG. 6 illustrates configuration 400A of a liquid battery cell being rotated, according to an illustrative methodology of the present disclosure. As shown, configuration 400A has a non-concentric stratification due to the centrifugal acceleration created by its non-concentric rotation around axis 600. In this example, when liquid battery cell 400A is rotated at high speeds, centrifugal acceleration influences the stratification more. Thus, in certain embodiments, a centrifugal force sensor 112 provides the orientation data to control system 108 so that it may determine the optimal terminals 204,212 to activate. In alternative embodiments, control system 108 may also calculate the centrifugal acceleration based upon the revolutions per minute ("RPM") of the downhole tool string or other component causing the rotation (when utilized in non-wellbore applications) and the cell 200 distance from the center of rotation. Nevertheless, at slower rotational speeds, a combination of centrifugal and angular data generated by sensors 112 may be used by control system 108 to determine the optimal selection of terminals 204,212 using, for example, the algorithm described above.

In yet other illustrative embodiments in which the liquid battery cells encounter additional movements, the various forces in play may be modeled to further aid control system 108 in the optimal selection of terminals 204,212. For example, an example would be fast trip in and trip out at an angle or horizontal borehole. The trip rate and angle will be taken into consideration when modeling the acceleration experienced by cell 200 that affects the stratification of liquid metal and electrolyte. Those ordinarily skilled in the art having the benefit of this disclosure realize this and other similar methodologies may be utilized to modeled a variety of forces acting on the cells.

Figure 7:
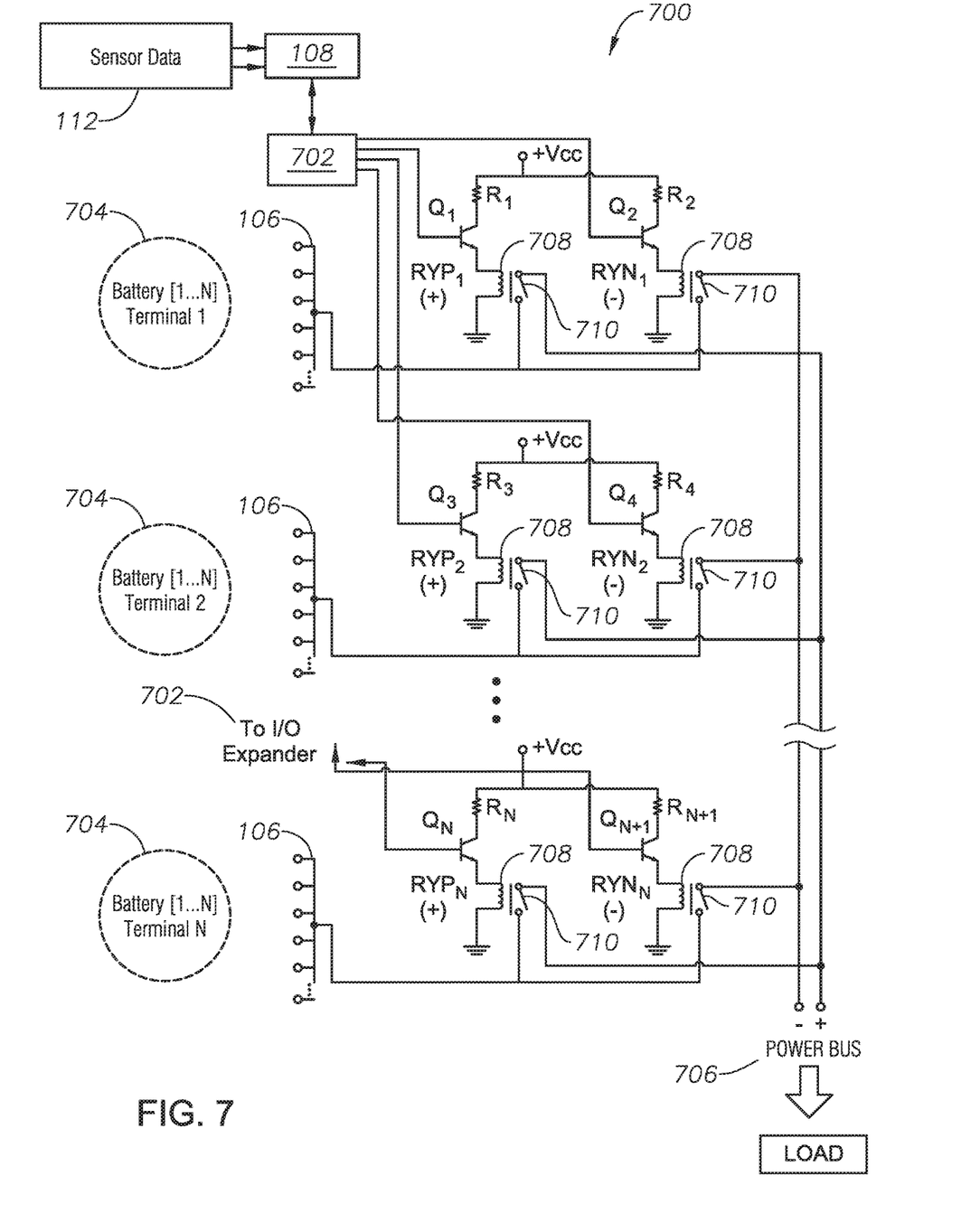
FIG. 7 illustrates a switching control circuit utilized by control system to activate a terminal pair, according to certain illustrative embodiments of the present disclosure.

FIG. 7 illustrates a switching control circuit utilized by control system 108 to activate a terminal pair, according to certain illustrative embodiments of the present disclosure. With reference to FIGS. 1 and 7, switching control circuit 700 is operationally coupled to control system 108 via an input/output ("I/O") expander 702. I/O expander 702 is a digital switch utilized by control system 108 to switch the relays of circuit 700 as described below. The design and operation of I/O expanders is known in the art. During operation, as the orientation data (e.g., positional, centrifugal, inclination, etc.) is received from sensors 112, control system 108 determines the terminals 204,212 to be activated from terminal matrix 106 of each liquid battery cell 704 and sends to appropriate activation signals to I/O expander 702 necessary to switch on the terminals 204,212 using circuit 700. Terminal matrix 106 is comprised on terminals 204,212 and their respective wiring.

Control circuit 700 utilizes a series of relay-type switches that are connected to the anode or cathode of electrochemical solution 208. In this illustrative embodiment, control circuit 700 includes relays RYP1, RYN1, RYP2, RYN2, RYPN and RYNN. Relays RYP1, RYN1, RYP2, RYN2, RYPN and RYNN each include a transistor Q1 . . . QN2 having a base connected to the output of I/O expander 702 to thereby switch on/off the relays. The collectors of each transistor pair are connected in parallel to a resistor R1 . . . RN+1 through which a voltage is delivered from voltage sources +Vcc. The illustrated embodiment is useful for high current applications, thus the use of a parallel configuration. However, in other embodiments used in high voltage applications, a series configuration may be utilized, as will be understood by those ordinarily skilled in the art having the benefit of this disclosure. Nevertheless, Vcc, in certain embodiments, is a conventional power source (a capacitor bank or source 114, for example), while in others +Vcc may be the power provided from battery cells 704 themselves. As a result, relays RYP1 . . . RYNN may be powered from battery cells 704 or from a secondary power source, as previously described. Although not shown, +Vcc would include the circuitry necessary to switch between the two power sources, as well as a power regulator to stabilize the power, as will be understood by those same ordinarily skilled persons.

Still referring to FIG. 7, the emitter of transistors Q1 . . . QN2 are connected to a relay coil to thereby activate their corresponding switches 710 to provide power to a load via power bus 706. Switches 710 are biased in the open position. In this illustrative embodiment, terminals 204,212 are assigned a number, such as, for example, terminal 1 ("T1"), terminal 2 ("T2"), etc. Thus, relays RYP1 and RYN1 are both connected to T1 of each battery cell 704, relays RYP2 and RYN2 are connected to T2 of each battery cell 704, and relays RYPN and RYNN are both connected to TN of each battery cell 704. Terminals 204,212 in the matrix 106 at a particular vertex are tied together since all cells are expected to be subjected to the same positional and rotational changes. Also, in this example, relays RYP1, RYP2 and RYPN are anode switches, while relays RYN1, RYN2 and RYNN are cathode switches.

Therefore, during operation, if control system 108 selects T1 as the anode and T2 as the cathode (based upon orientation data received from sensors 112), control system 108 transmits a signal to the gates of the transistors of RYP1 and RYP2 to thereby prevent or allow current flow through their emitters. As a result, switch 710 of relay RYP1 will be closed to thereby provide anode power using T1, while switch 710 of relay RYN2 is closed to thereby provide cathode power using T2. Accordingly, control circuit 700 applies a microprocessor-based switching control to activate a terminal pair from each of liquid battery cells 710's terminal matrix.

Figure 8A:
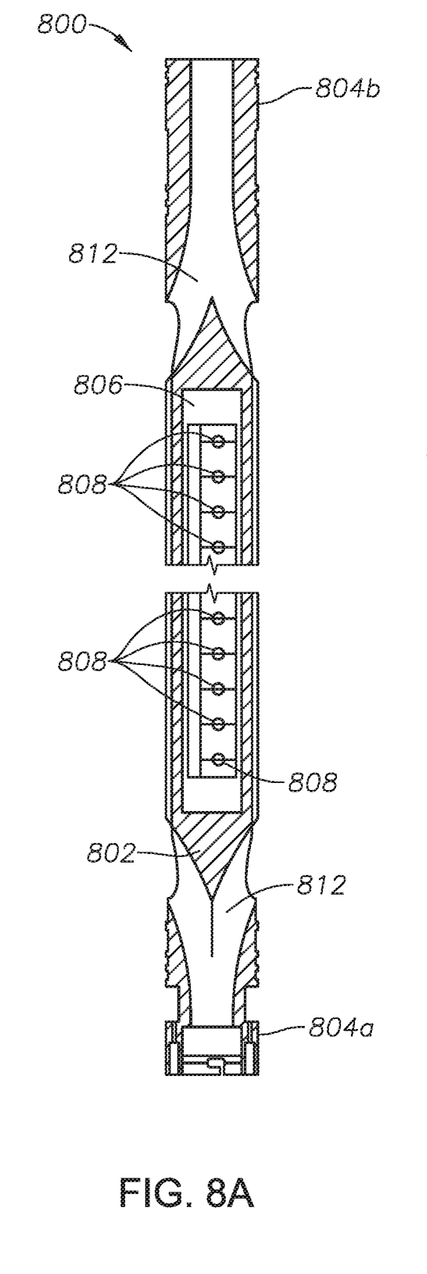
FIG. 8A is a cross-sectional view of a power system tool assembly, according to one illustrative embodiment of the present disclosure.

As previously mentioned, the illustrative battery cells described herein may be utilized in a variety of applications. One such application is a downhole environment whereby a power system using one or more battery cells is positioned along a downhole string. FIG. 8A is a cross-sectional view of a power system tool assembly 800, according to one illustrative embodiment of the present disclosure. Tool assembly 800 includes a body 802 made of suitable material to withstand the downhole environment (iron, for example). Body 802 includes threaded box/pin connections 804a and 804b, respectively. In other embodiments, a variety of other connections may also be utilized. A pressure-balanced compartment 806 is positioned along body 802 in a side mounting fashion. Although not shown, body 802 also includes the necessary ports for wires in which to transmit power from the battery cells to the downhole components as necessary.

Figure 8B:
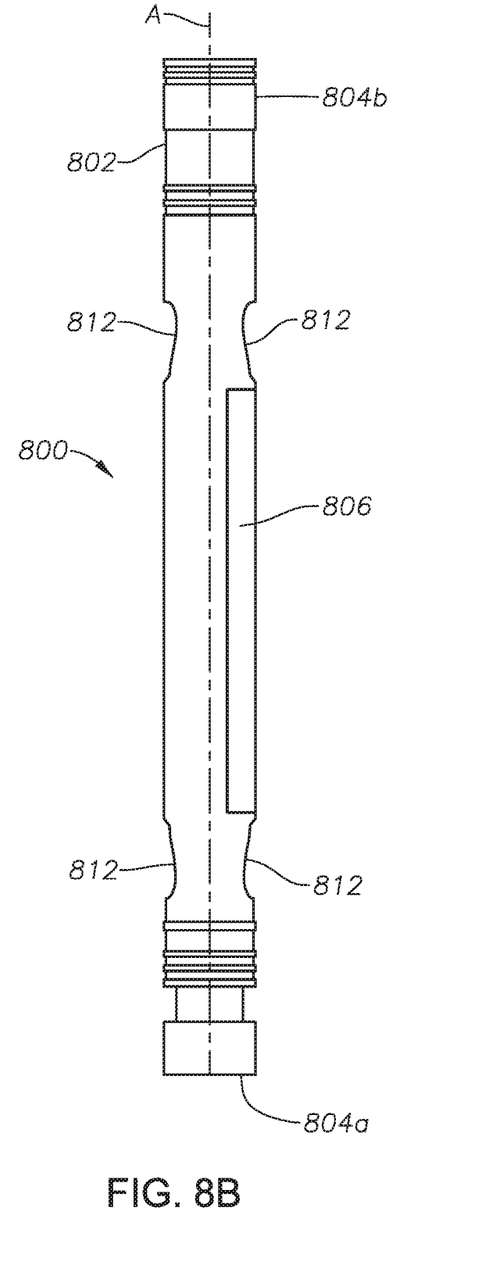
FIG. 8B is a simplified illustration of the assembly of FIG. 8A.

One or more battery cells 808 are positioned within a liquid cell assembly 810 as previously described in other embodiments. Pressure-balanced compartment 806 is positioned within body 802 in a non-concentric fashion as shown in FIG. 8B, which illustrates a simplified tool assembly 800 having an axis A. As shown, compartment 806 is not concentric with axis A. As a result, when the downhole string (and thus tool 800) rotates, the non-concentricity provides biased centrifugal force acting on the molten metal in electrochemical solution 208, thereby avoiding the creation of cylindrical stratification of the liquid battery components. Although not shown, in certain embodiments, a vibration damper may be placed between the assembly 810 and pressure-balanced compartment 806. A bore 812 is positioned along body 802 to divert fluid around compartment 806. In this embodiment, the fluid would be diverted outside body 802 and back into body 802. However, in other embodiments, the fluid may be diverted around compartment 806, but still remain inside body 802.

Figure 9:
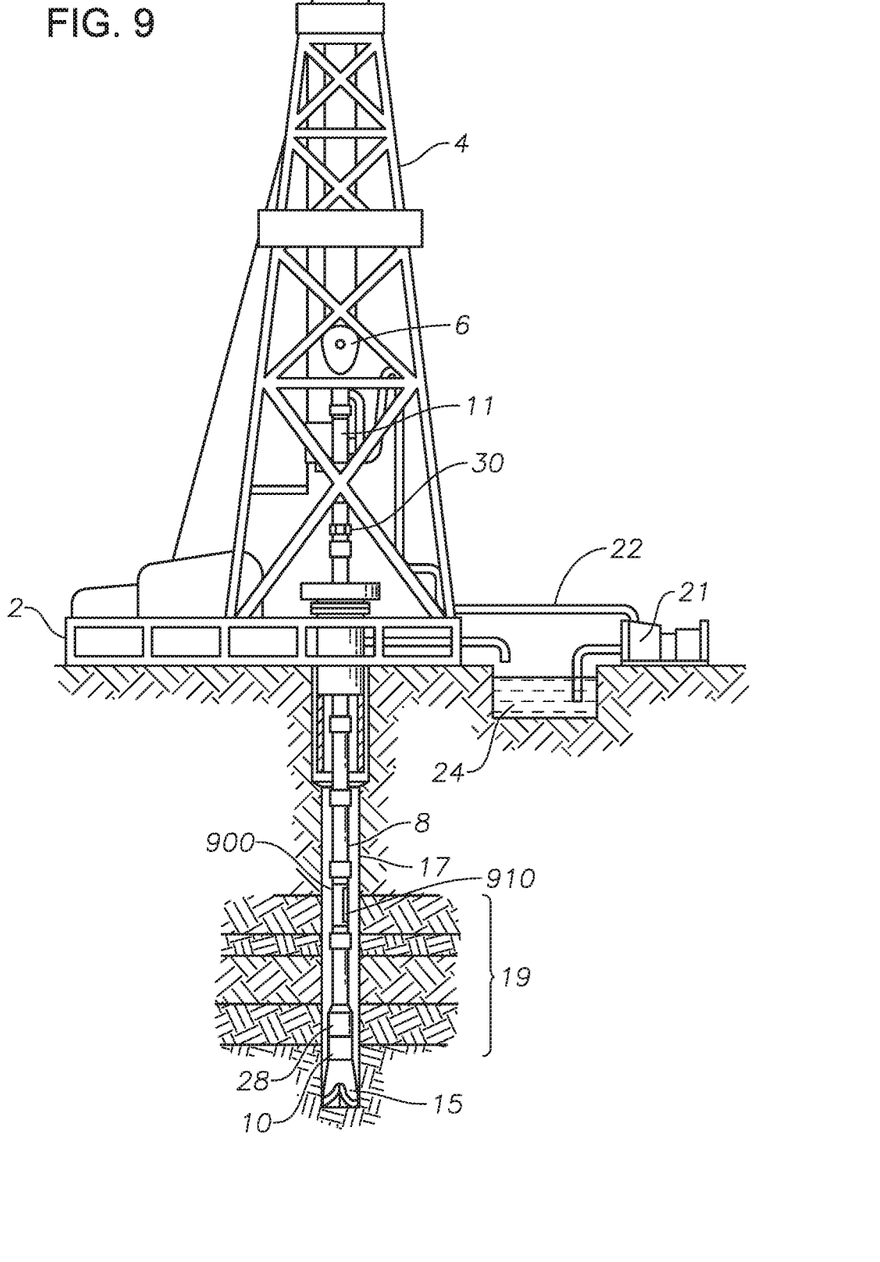
FIG. 9 illustrates a downhole power system utilized in a downhole application, according to an illustrative application of the present disclosure.

FIG. 9 illustrates a downhole power system utilized in a downhole application, according to an illustrative application of the present disclosure. Power system 900 may be any of those system described herein. In this example, power system 900 is utilized with a logging-while-drilling ("LWD") assembly; alternatively, power system 900 may be embodied within a measurement-while drilling assembly ("MWD"), wireline, slickline, coiled tubing or other desired downhole assembly or conveyance. Nevertheless, a drilling platform 2 equipped with a derrick 4 that supports a hoist 6 for raising and lowering a drill string 8. Hoist 6 suspends a top drive 11 suitable for rotating drill string 8 and lowering it through well head 13. Connected to the lower end of drill string 8 is a drill bit 15. As drill bit 15 rotates, it creates a wellbore 17 that passes through various formations 19. A pump 21 circulates drilling fluid through a supply pipe 22 to top drive 11, down through the interior of drill string 8, through orifices in drill bit 15, back to the surface via the annulus around drill string 8, and into a retention pit 24. The drilling fluid transports cuttings from the borehole into pit 24 and aids in maintaining the integrity of wellbore 16. Various materials can be used for drilling fluid, including, but not limited to, a salt-water based conductive mud.

A logging tool 10 is integrated into the BHA near the bit 15. In this illustrative embodiment, logging tool 10 is an LWD tool; however, in other illustrative embodiments, logging tool 10 may be utilized in a coiled tubing-convey logging application. Logging tool 10 may be, for example, an ultra-deep reading resistivity tool. Alternatively, non-ultra-deep resistivity logging tools may also be utilized in the same drill string along with the deep reading logging tool. Moreover, in certain illustrative embodiments, logging tool 10 may be adapted to perform logging operations in both open and cased hole environments.

Still referring to FIG. 1, as drill bit 15 extends wellbore 17 through formations 19, logging tool 10 collects measurement signals relating to various formation properties, as well as the tool orientation and various other drilling conditions. In certain embodiments, logging tool 10 may take the form of a drill collar, i.e., a thick-walled tubular that provides weight and rigidity to aid the drilling process. However, as described herein, logging tool 10 includes an induction or propagation resistivity tool to sense geology and resistivity of formations. A telemetry module 28 is used to communicate images and measurement data/signals to a surface receiver and to receive commands from the surface. In some embodiments, the telemetry module does not communicate the data to the surface, but rather stores the data for later retrieval at the surface when the logging assembly is recovered.

Power system 900 is positioned along drill string 8 as illustrated to provide power to various loads along string 8. In alternative embodiments, however, the power system may be close, coupled or adjacent to the logging tool. Nevertheless, during initial deployment, the battery cells of power system 900 may already be charged, or may be powered using a back-up power source. As drill bit 15 continues to drill, string 8 rotates, thus also causing the rotation of the battery cells. When it is desired to power loads using power system 900, the control system circuitry of system 900 is activated, whereby the orientation of power system 900 is determined using the necessary sensors positioned along string 8. The resulting orientation data is then transmitted to the control system, whereby two or more terminals along the battery cells are selectively activated. The selected terminals will include at least one terminal that is in contact with the anode, and at least one other terminal that is in contact with the cathode, thus completing the circuit. As a result, power is then delivered to the loads as desired.

Utilizing the liquid battery cells of the present disclosure provides a number of advantages. First, for example, the power system may be used in mobile applications in which the batteries do not remain in a static condition. Second, when used in a downhole environment, the batteries may remain downhole longer since they may be recharged. Third, the use of liquid metal solution allows the cells to be used in high temperature environments. Moreover, by using earth abundant elements, the liquid metal cells are economical. These and other advantages will be apparent to those ordinarily skilled persons described herein.

Embodiments described herein further relate to any one or more of the following paragraphs:

1. A downhole power system, comprising a liquid battery cell comprising: a cell housing having a plurality of conductive terminals positioned there-around; and an electrochemical solution positioned inside the cell housing, wherein the electrochemical solution is in contact with two or more of the conductive terminals; and a control system to selectively activate two or more of the conductive terminals based upon an orientation of the liquid battery cell.

2. A downhole power system as defined in paragraph 1, wherein the electrochemical solution is a liquid-metal solution.

3. A downhole power system as defined in any of paragraphs 1-2, wherein the cell housing has a polyhedron shape having a plurality of vertices; and the conductive terminals are positioned at the vertices.

4. A downhole power system as defined in any of paragraphs 1-3, wherein the cell housing has a spherical shape.

5. A downhole power system as defined in any of paragraphs 1-4, wherein the cell housing further comprises a hollow compartment in which the electrochemical solution is located, wherein the conductive terminals have a first end extending into the hollow compartment and a second end extending outside the cell housing; and a heating element positioned inside the hollow compartment to heat the electrochemical solution.

6. A downhole power system as defined in any of paragraphs 1-5, further comprising a sensor operationally coupled to the control system to thereby determine the orientation of the liquid battery cell.

7. A downhole power system as defined in any of paragraphs 1-6, wherein the sensor is a centrifugal force sensor or a positional sensor.

8. A downhole power system as defined in any of paragraphs 1-7, wherein the conductive terminals are equally or substantially equally spaced about the cell housing.

9. A downhole power system as defined in any of paragraphs 1-8, further comprising a secondary battery cell operationally coupled to the control system.

10. A downhole power system as defined in any of paragraphs 1-9, wherein the downhole power system is housed within a tool assembly positioned along a downhole string, the tool assembly comprising a pressure balanced compartment to house the battery cell such that battery cell is not concentric with an axis of the tool assembly; and a bore to divert fluid around the pressure balanced housing.

11. A method of utilizing a downhole power system, the method comprising deploying a liquid battery cell into a wellbore, the liquid battery cell comprising a cell housing having a plurality of conductive terminals positioned there-around; and an electrochemical solution positioned inside the cell housing, wherein the electrochemical solution is in contact with two or more of the conductive terminals; determining an orientation of the liquid battery cell; selectively activating two or more conductive terminals based upon the orientation of the liquid battery cell; and delivering power to a load using the selected conductive terminals.

12. A method as defined in paragraph 11, wherein selectively activating two or more conductive terminals further comprises selecting at least one conductive terminal that is in contact with an anode of the electrochemical solution; and selecting at least one conductive terminal that is in contact with a cathode of the electrochemical solution.

13. A method as defined in any of paragraphs 11-12, wherein deploying the liquid battery cell further comprises rotating the liquid battery cell along a downhole string.

14. A method as defined in any of paragraphs 11-13, wherein the electrochemical solution is a liquid-metal solution.

15. A method as defined in any of paragraphs 11-14, wherein determining the orientation of the liquid battery cell comprises determining a centrifugal acceleration acting on the liquid battery cell; or determining a position of the liquid battery cell.

16. A power system, comprising a liquid battery cell comprising a cell housing having a plurality of conductive terminals positioned there-around; and an electrochemical solution positioned inside the cell housing, wherein the electrochemical solution is in contact with two or more of the conductive terminals; and a control system to selectively activate two or more of the conductive terminals based upon an orientation of the liquid battery cell.

17. A power system as defined in paragraph 16, wherein the electrochemical solution is a liquid-metal solution.

18. A power system as defined in any of paragraphs 16-17, wherein the cell housing has a polyhedron or spherical shape.

19. A power system as defined in any of paragraphs 16-18, further comprising a sensor operationally coupled to the control system to thereby determine the orientation of the liquid battery cell, the sensor being at least one of a centrifugal force sensor or a positional sensor.

20. A power system as defined in any of paragraphs 16-19, wherein the power system is connected along a downhole string positioned along a wellbore.

Moreover, any of the methodologies described herein may be embodied within a system comprising processing circuitry to implement any of the methods, or a in a computer-program product comprising instructions which, when executed by at least one processor, causes the processor to perform any of the methods described herein.

The foregoing disclosure may repeat reference numerals and/or letters in the various examples. This repetition is for the purpose of simplicity and clarity and does not in itself dictate a relationship between the various embodiments and/or configurations discussed. Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the apparatus in use or operation in addition to the orientation depicted in the figures. For example, if the apparatus in the figures is turned over, elements described as being "below" or "beneath" other elements or features would then be oriented "above" the other elements or features. Thus, the exemplary term "below" can encompass both an orientation of above and below. The apparatus may be otherwise oriented (rotated 90 degrees or at other orientations) and the spatially relative descriptors used herein may likewise be interpreted accordingly.

Although various embodiments and methodologies have been shown and described, the disclosure is not limited to such embodiments and methodologies and will be understood to include all modifications and variations as would be apparent to one skilled in the art. Therefore, it should be understood that the disclosure is not intended to be limited to the particular forms disclosed. Rather, the intention is to cover all modifications, equivalents and alternatives falling within the spirit and scope of the disclosure as defined by the appended claims.

What is claimed is:

1. A method of using a downhole power system, the method comprising:
   deploying a liquid battery cell into a wellbore, the liquid battery cell comprising:
      a spherical or polyhedron-shaped cell housing having a surface with a plurality of conductive terminals positioned there-around; and
      an electrochemical solution positioned inside the cell housing, wherein the electrochemical solution is in contact with two or more of the conductive terminals;
   using a sensor to determine an orientation of the liquid battery cell, wherein a control system is operationally coupled to the sensor to receive data corresponding to the orientation of the liquid battery cell;
   in response to the orientation data, using the control system to selectively activate two or more conductive terminals based upon the orientation of the liquid battery cell; and
   delivering power to a load using the selected conductive terminals.

2. The method as defined in claim 1, wherein selectively activating two or more conductive terminals further comprises:
   selecting at least one conductive terminal that is in contact with an anode of the electrochemical solution; and
   selecting at least one conductive terminal that is in contact with a cathode of the electrochemical solution.

3. The method as defined in claim 1, wherein deploying the liquid battery cell further comprises rotating the liquid battery cell along a downhole string.

4. The method as defined in claim 1, wherein the electrochemical solution is a liquid-metal solution.

5. The method as defined in claim 1, wherein determining the orientation of the liquid battery cell comprises:
   determining a centrifugal acceleration acting on the liquid battery cell; or
   determining a position of the liquid battery cell.

6. A method of using a downhole power system, the method comprising:
   deploying a liquid battery cell into a wellbore, the liquid battery cell comprising:
      a spherical or polyhedron-shaped cell housing having a surface with a plurality of conductive terminals positioned there-around; and
      an electrochemical solution positioned inside the cell housing, wherein the electrochemical solution is in contact with two or more of the conductive terminals;
   determining an orientation of the liquid battery cell;
   selectively activating two or more conductive terminals based upon the orientation of the liquid battery cell; and
   delivering power to a load using the selected conductive terminals.

7. The method as defined in claim 6, wherein selectively activating two or more conductive terminals further comprises:
   selecting at least one conductive terminal that is in contact with an anode of the electrochemical solution; and
   selecting at least one conductive terminal that is in contact with a cathode of the electrochemical solution.

8. The method as defined in claim 6, wherein deploying the liquid battery cell further comprises rotating the liquid battery cell along a downhole string.

9. The method as defined in claim 6, wherein the electrochemical solution is a liquid-metal solution.

10. The method as defined in claim 6, wherein determining the orientation of the liquid battery cell comprises:
   determining a centrifugal acceleration acting on the liquid battery cell; or
   determining a position of the liquid battery cell.

* * * * *